(12) United States Patent
Straker et al.

(10) Patent No.: US 10,451,018 B2
(45) Date of Patent: Oct. 22, 2019

(54) METHOD OF CONTROLLING A BELT DRIVE OF AN ENGINE OF A MOTOR VEHICLE

(71) Applicant: Ford Global Technologies, LLC, Dearborn, MA (US)

(72) Inventors: James Andrew Straker, Brentwood (GB); Ian Robinson, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 125 days.

(21) Appl. No.: 14/541,889

(22) Filed: Nov. 14, 2014

(65) Prior Publication Data

US 2015/0144099 A1    May 28, 2015

(30) Foreign Application Priority Data

Nov. 26, 2013  (GB) .................................. 1320809.5

(51) Int. Cl.
| | | |
|---|---|---|
| *F02N 11/08* | (2006.01) | |
| *F02N 11/04* | (2006.01) | |
| *F16H 7/12* | (2006.01) | |
| *F02N 15/08* | (2006.01) | |
| *F02N 19/00* | (2010.01) | |

(52) U.S. Cl.
CPC .......... *F02N 11/0803* (2013.01); *F02N 11/04* (2013.01); *F02N 11/0866* (2013.01); *F02N 15/08* (2013.01); *F02N 2011/0888* (2013.01); *F02N 2019/008* (2013.01); *F16H 7/12* (2013.01)

(58) Field of Classification Search
CPC ...... B60W 10/08; B60W 10/06; B60W 20/00; B60W 2710/083; B60W 10/26; B60W 20/40; B60W 30/18018; B60W 2510/0685; Y02T 10/7005; Y02T 10/6286;

(Continued)

(56) References Cited

U.S. PATENT DOCUMENTS

| | | | | |
|---|---|---|---|---|
| 5,323,743 A | * | 6/1994 | Kristiansson | ........... F02N 11/04 123/179.28 |
| 6,040,634 A | * | 3/2000 | Larguier | .................. B60K 6/26 290/45 |

(Continued)

FOREIGN PATENT DOCUMENTS

| | | |
|---|---|---|
| CN | 103184944 A | 7/2013 |
| DE | 102012105087 A1 | 12/2013 |
| EP | 1422421 B1 | 11/2010 |

OTHER PUBLICATIONS

State Intellectual Property Office of the People's Republic of China, Office Action and Search Report Issued in Application No. 201410688161.4, dated Aug. 28, 2018, 8 pages. (Submitted with Partial Translation).

*Primary Examiner* — Carl C Staubach
(74) *Attorney, Agent, or Firm* — Julia Voutyras; McCoy Russell LLP

(57) ABSTRACT

Systems and methods for a vehicle comprising a stop-start system and in particular to a motor vehicle having a belt driven integrated starter-generator (BISG) drivingly connected to an accessory drive belt of an engine of the motor vehicle are provided. The BISG may be used during an engine stop event to preposition the crank at an angle from which it facilitates rapid restart of the engine and during engine running the BISG may be used as a power generator.

12 Claims, 5 Drawing Sheets

(58) Field of Classification Search
CPC .. Y02T 10/48; Y02T 10/6226; F02N 11/0818; F02N 11/0814
USPC ...... 701/112, 113; 123/179.3–179.4, 179.25, 123/185.13; 180/9.64, 350, 357, 65.21, 180/65.285, 65.29, 65.31
See application file for complete search history.

(56) References Cited

U.S. PATENT DOCUMENTS

| | | | |
|---|---|---|---|
| 6,202,614 B1 | 3/2001 | Grob et al. | |
| 6,807,934 B2 | 10/2004 | Kataoka et al. | |
| 7,135,784 B2* | 11/2006 | Murty | F02N 11/04 290/36 R |
| 7,217,206 B2* | 5/2007 | Stone | F01L 1/024 474/110 |
| 7,261,076 B2* | 8/2007 | Hoevermann | F02D 41/009 123/179.28 |
| 7,463,968 B2 | 12/2008 | Snyder | |
| 7,527,580 B2 | 5/2009 | Freisinger | |
| 7,856,954 B2 | 12/2010 | Steiner et al. | |
| 8,770,163 B2* | 7/2014 | Quincerot | F02N 11/10 123/179.1 |
| 2002/0093202 A1 | 7/2002 | Downs et al. | |
| 2004/0023755 A1* | 2/2004 | Nozaki | B60W 10/06 477/45 |
| 2005/0229889 A1 | 10/2005 | Hoevermann | |
| 2007/0157899 A1* | 7/2007 | Seufert | B60K 6/387 123/179.25 |
| 2007/0204830 A1* | 9/2007 | Andri | B60K 6/445 123/198 F |
| 2008/0127935 A1 | 6/2008 | Park | |
| 2009/0013952 A1* | 1/2009 | Deniston | B60K 6/485 123/179.28 |
| 2009/0199807 A1* | 8/2009 | Schafer | F01L 1/34 123/182.1 |
| 2010/0076634 A1* | 3/2010 | Brigham | B60K 6/485 701/22 |
| 2010/0283243 A1* | 11/2010 | Armiroli | F02N 11/04 290/31 |
| 2011/0070985 A1* | 3/2011 | Deneszczuk | F16H 7/1281 474/135 |
| 2013/0172137 A1* | 7/2013 | Antchak | B60K 25/02 474/133 |
| 2014/0130635 A1* | 5/2014 | Kees | F02N 11/006 74/7 R |
| 2015/0167796 A1* | 6/2015 | Noguchi | F16H 7/1281 477/3 |

* cited by examiner

METHOD OF CONTROLLING A BELT DRIVE OF AN ENGINE OF A MOTOR VEHICLE

CROSS REFERENCE TO RELATED APPLICATIONS

The present application claims priority to Great Britain Application No. 1320809.5, "A METHOD OF CONTROLLING AN ENGINE OF A MOTOR VEHICLE," filed Nov. 26, 2013, the entire contents of which are hereby incorporated by reference for all purposes.

FIELD

The present application relates to a motor vehicle comprising a stop-start system and in particular to a motor vehicle having a belt driven integrated starter-generator (BISG) drivingly connected to an accessory drive belt of an engine of the motor vehicle.

BACKGROUND\SUMMARY

Motor vehicles may have an engine start-stop during which as engine is temporarily shut down (E-stop) in order to save fuel and reduce emissions in response to the actions of a driver of the motor vehicle. The E-stops are normally controlled by a stop-start controller and use inputs such as clutch pedal position, accelerator pedal position, brake pedal position, and the engagement state of a transmission to determine when to stop and when to restart the engine. Fast actuation of the BISG is necessary for the engine cranking operation in the case of a restart from an E-stop as engine firing may be delayed to the 2nd or 3rd top dead centre (TDC) firing. A delay in engine firing can result in a failure to launch the car (from start-stop operation) due to engine stalling.

One attempt to address restarting the engine following an E-stop is disclosed by Kataoka et al in U.S. Pat. No. 6,807,934 wherein a motor generator is used to assist with positioning the crankshaft in an optimum position for the restart. Yet another attempt to address restarting the engine following an E-stop is disclosed by Grob et al in U.S. Pat. No. 6,202,614 wherein the crankshaft is put in a predeterminable starting position via an electrical machine when an engine restart signal is received and before ignition is performed for an engine restart.

However, the inventors herein have recognized potential issues with such systems. In the approach of Kataoka et al, pre-tensioning the belt drive using the BISG is not possible. In the approach of Grob et al, the restart signal is provided as the engine is ready to start and there may be a need to wait for the engine to be positioned.

One potential approach to at least partially address some of the above issues includes a system and a method of controlling an engine of a motor vehicle comprising an engine and a belt drive wherein the belt drive is drivingly connecting a crankshaft of the engine to an integrated starter-generator. The system further comprises a least one belt tensioner for applying a tension to the belt drive. The method comprises determining whether it is desirable to perform an automatic engine stop. If it is desirable to stop the engine, the engine may be stopped. When the engine has stopped, the belt integrated starter-generator may be energized to rotate the crankshaft at low speed in the direction required for starting the engine while applying a high torque to the belt drive to pre-tension the belt drive to be ready for restarting the engine.

For example, the BISG may be rotated at a low speed after the engine has been stopped in order to pretension the drive belt and position the crankshaft of the engine in an ideal position for restarting. The BISG may be energized at a level sufficient to provide a holding torque. Thus, a robust and rapid engine start using the BISG without belt slippage and the need to increase static belt tension may be provided. In another example, the BISG may be kept energized at the holding level for a predefined period of time so as to give time for any pressure in a compressed cylinder to dissipate and then, after the predefined period of time has elapsed, the BISG is de-energized or powered down. In such a case the predefined period of time would need to be set so as to provide sufficient time for the compressed gas to dissipate.

In this way, a BISG may be used to pre-tension a FEAD belt when an engine has entered an E-stop by rotating the crankshaft slowing in the same direction required for starting the engine with the BISG operating at high torque. The rotation of the crankshaft is slow enough to prevent firing of the engine. This allows for the crankshaft to be rotated into a preferred rotational position ready for restarting the engine. Upon an engine restart, the BISG is used to drive the FEAD belt to rotate the crankshaft. Thus, a rapid restart of the engine is provided.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

DETAILED DESCRIPTION

Figure 1:
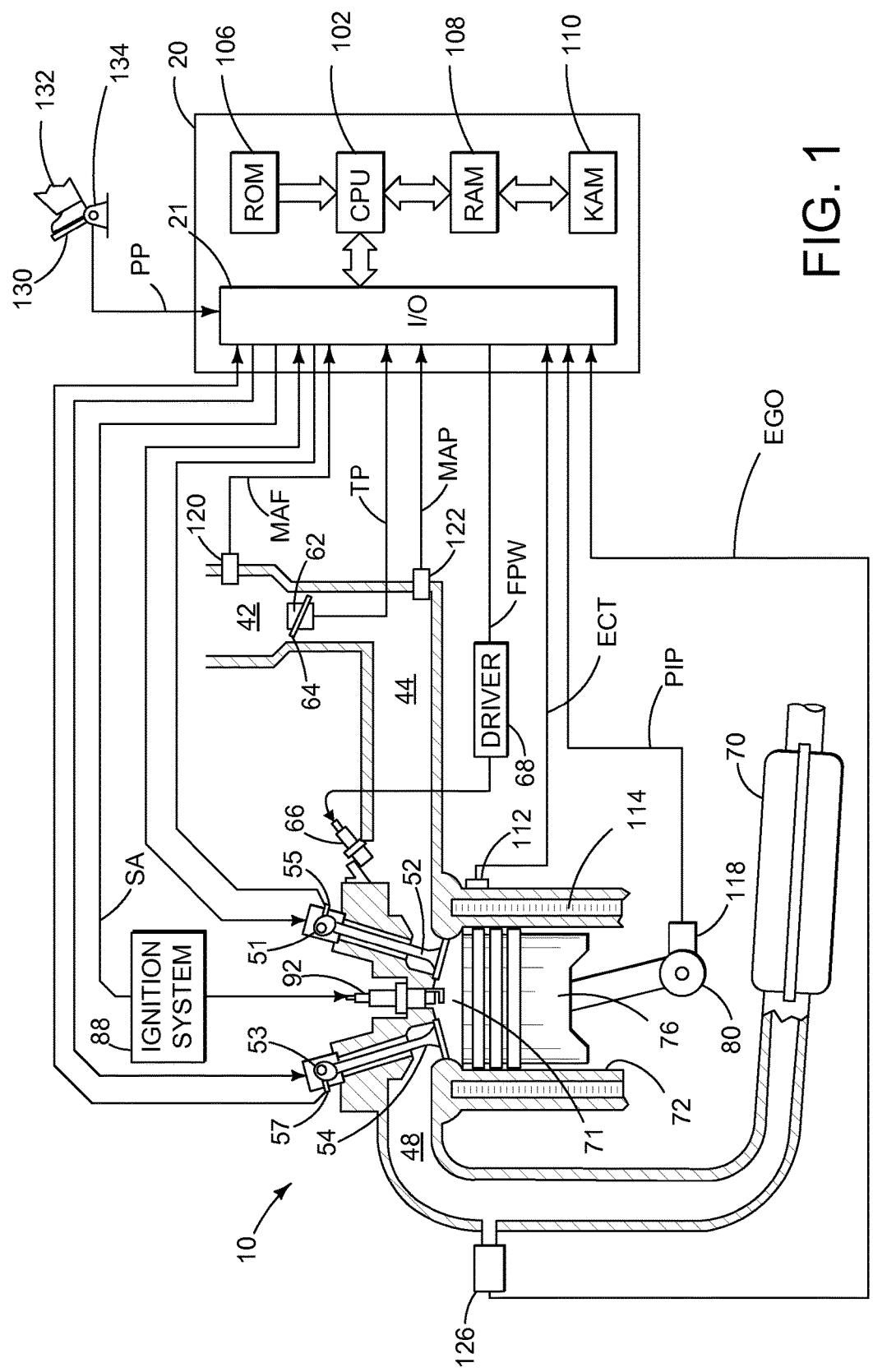
FIG. 1 is an example schematic diagram of one cylinder of multi-cylinder engine of a motor vehicle comprising a control system.

The following description relates to systems and methods of a motor vehicle comprising a stop-start system. For example, a motor vehicle comprising an engine, such as the engine of FIG. 1, having a belt driven integrated starter-generator (BISG) drivingly connected to a front end accessory drive belt (FEAD belt) of an engine of the motor vehicle, such as illustrated in FIGS. 2 and 3, may be controlled to pre-tension the FEAD drive belt in order to enact a quick restart. In another example, a motor vehicle may have a BISG drivingly connected to a rear end accessory drive belt (READ belt). A method for a BISG may be provided for restarting an engine of a motor vehicle following a period of time in which the engine has been temporarily stopped (E-stop) in order to save fuel and reduce emissions in response to the actions of a driver of the motor vehicle, such as the method illustrated in FIG. 4. Such E-stops may be normally controlled by a stop-start controller and use inputs such as clutch pedal position, accelerator pedal position, brake pedal position and the engagement state of a transmission to determine when to stop and when to restart the engine.

Further, a passive belt tensioner may be provided for tensioning the FEAD belt. A passive belt tensioner is one where a static pre-load is applied to the belt by urging a roller or pulley against the belt.

During an engine cranking operation in which the BISG is used to drive the FEAD belt, if the torque on profile is too aggressive that is to say, the torque is increased too rapidly, belt slip may occur as the FEAD tensioner may not react quickly enough. One option to counteract such slippage is to increase the static belt tension. However, increasing the static belt tension may have a negative effect because belt friction is also increased and this may increase vehicle fuel consumption and reduce the life of the FEAD belt.

Fast actuation of the BISG is however necessary for the engine cranking operation in the case of a restart from an E-stop. This is because, if the BISG is not powered up quickly, engine firing may be delayed to the 2nd or 3rd top dead centre (TDC) firing. Any delay in engine firing may result in a failure to launch the car (from start-stop operation) due to engine stalling.

Further, the launch quality may be poor due to a slow pull away due to the increased time for the engine torque to reach an adequate level for accelerating the motor vehicle.

Both of these events may lead to customer dissatisfaction.

The current application provides a system and method of controlling an engine of a motor vehicle that provides a robust and rapid engine start using the BISG without belt slippage and without increasing static belt tension.

According to the current application a method of controlling an engine of a motor vehicle comprising an engine, a belt drive wherein the belt drive may be drivingly connecting a crankshaft of the engine to an integrated starter-generator is provided. The engine further comprising at least one belt tensioner for applying a tension load to the belt drive wherein the method comprises determining whether it may be desirable to perform an automatic engine stop. If it is determined to be desirable to stop the engine, the method may stop the engine and, when the engine has stopped, energizing the belt integrated starter-generator to rotate the crankshaft at low speed in the direction required for starting the engine while applying a high torque to the belt drive to pre-tension the belt drive ready for restarting of the engine. In one example, the belt drive may be a FEAD belt. In another example, the belt drive may be a READ belt.

In one embodiment, the at least one belt tensioner may be a passive belt tensioner.

The method may further comprise using the integrated starter-generator to rotate the crankshaft at low speed while applying a high torque to the belt drive until the crankshaft has been rotated into an optimum position for restarting the engine.

The method may further comprise maintaining the integrated starter-generator energized after the optimum position has been attained in order to resist rotation of the crankshaft away from the optimum position for restarting of the engine.

The method may further comprise determining whether it may be desirable to perform an automatic engine stop if predefined conditions are present. For example, an automatic engine stop may be performed if the transmission is in a disengaged state. In another example, an automatic engine stop may be performed if the transmission is in an engaged state but the clutch pedal is in a released (not depressed) state and the brake pedal is in the released state. It will be appreciated that other predefined conditions may exist for determining stopping the engine.

The method may further comprise using the integrated starter-generator to restart the engine if predefined conditions for restarting the engine are present. For example, the pedal states may be monitored for changes for determining if conditions for restarting the engine are present. In one example, depressing the clutch pedal while the brake pedal remains released may be used to indicate that that conditions for an engine restart are present. In another example, the accelerator pedal position may be monitored and if the accelerator pedal is pressed, an engine restart condition may be determined to be present. Thus, conditions for determining an engine restart may depend upon the respective states of the clutch pedal, brake pedal, and accelerator pedal during the engine stopped states. It should be noted that more than one combination of the pedals may be provided to enable restarting of the engine.

The high torque may be a torque at or close to the maximum torque available from the integrated starter-motor.

The crankshaft may be rotated at a speed of less than fifty revolutions per minute.

According to a second aspect of the current application there is provided a motor vehicle comprising an engine with a crankshaft driveably connected by a belt drive to an integrated starter-generator, at least one belt tensioner to apply tension to the belt drive and an electronic controller to control operation of the engine and the integrated starter-generator, wherein the electronic controller determines whether it is desirable to perform an automatic engine stop and, if it is desirable to stop the engine, stops the engine and, when the engine has stopped, energizes the integrated starter-generator to rotate the crankshaft at low speed in the direction required for starting the engine while applying a high torque to the belt drive to pre-tension the belt drive ready for restarting of the engine.

The at least one belt tensioner may be a passive belt tensioner.

The electronic controller may use the integrated starter-generator to rotate the crankshaft at low speed while applying a high torque to the belt drive until the crankshaft has been rotated into an optimum position for restarting the engine.

The electronic controller may maintain the integrated starter-generator energized after the optimum position has been attained in order to resist rotation of the crankshaft away from the optimum position for restarting of the engine.

The electronic controller may use the integrated starter-generator to restart the engine when the conditions for restarting the engine are present.

The high torque may be a torque at or close to the maximum torque available from the integrated starter-motor.

The low rotational speed of the crankshaft may be a speed too low for firing of the engine to occur.

In one example, the rotational speed may be less than fifty revolutions per minute.

The current application will now be described by way of example with reference to the accompanying drawings.

Figure 2:
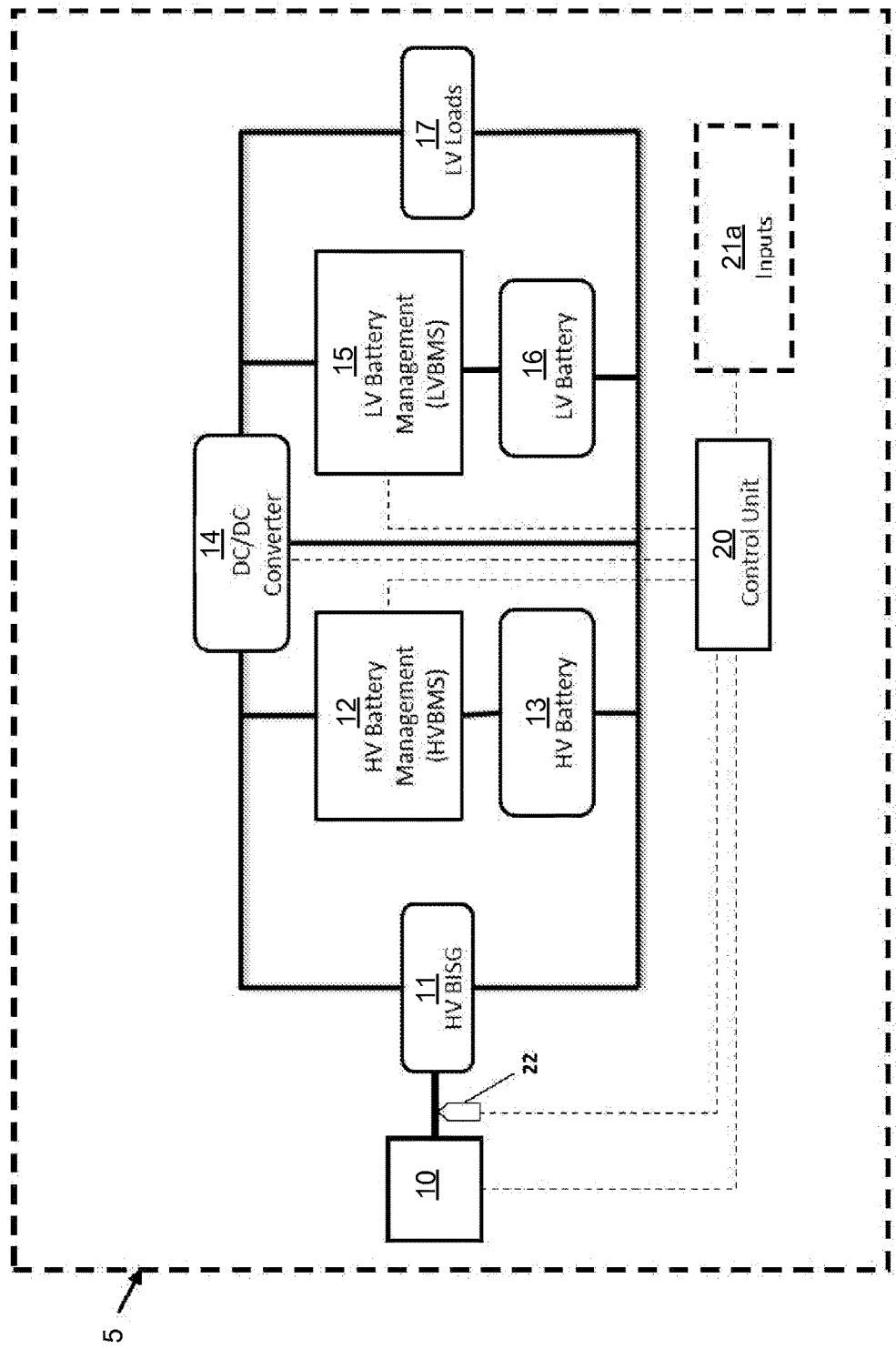
FIG. 2 shows a schematic diagram of a front end accessory drive structure coupled to an engine.
Figure 3A:
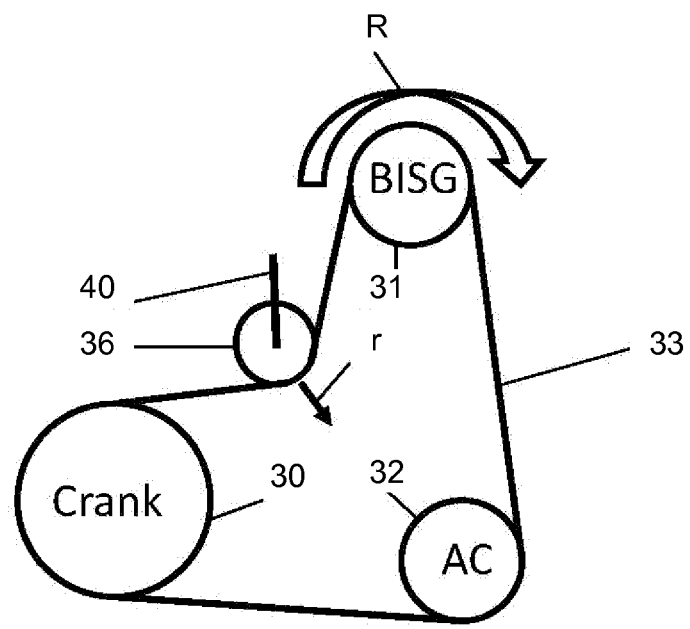
FIGS. 3A, 3B and 3C are example schematic representations of various passive belt tensioner arrangements.
Figure 3B:
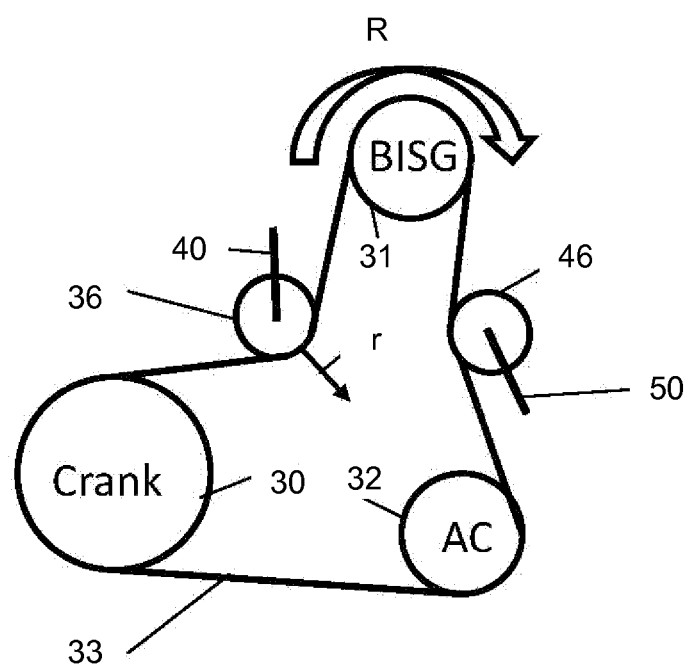

Referring to FIG. 1, a schematic diagram showing one cylinder of multi-cylinder engine 10, which may be included in a propulsion system of an automobile, is illustrated. Engine 10 may be controlled at least partially by a control system including controller 20 and by input from a vehicle operator 132 via an input device 130. In this example, input device 130 includes an accelerator pedal and a pedal position sensor 134 for generating a proportional pedal position signal PP. Combustion chamber (i.e., cylinder) 71 of engine 10 may include combustion chamber walls 72 with piston 76 positioned therein. Piston 76 may be coupled to crankshaft 80 so that reciprocating motion of the piston is translated into rotational motion of the crankshaft. Crankshaft 80 may be coupled to at least one drive wheel of a vehicle via an intermediate transmission system. Further, a starter motor may be coupled to crankshaft 80 via a flywheel to enable a starting operation of engine 10. For example, a BISG may be coupled to the crankshaft via a FEAD belt as illustrated in FIGS. 3A-3B.

Combustion chamber 71 may receive intake air from intake manifold 44 via intake passage 42 and may exhaust combustion gases via exhaust passage 48. Intake manifold 44 and exhaust passage 48 can selectively communicate with combustion chamber 71 via respective intake valve 52 and exhaust valve 54. In some embodiments, combustion chamber 71 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 20 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 71 may alternatively include an intake valve controlled via electric valve actuation and an exhaust valve controlled via cam actuation including CPS and/or VCT systems.

Fuel injector 66 is shown arranged in intake manifold 44 in a configuration that provides what is known as port injection of fuel into the intake port upstream of combustion chamber 71. Fuel injector 66 may inject fuel in proportion to the pulse width of signal FPW received from controller 20 via electronic driver 68. Fuel may be delivered to fuel injector 66 by a fuel system (not shown) including a fuel tank, a fuel pump, and a fuel rail. In some embodiments, combustion chamber 71 may alternatively or additionally include a fuel injector coupled directly to combustion chamber 71 for injecting fuel directly therein, in a manner known as direct injection.

Intake passage 42 may include a throttle 62 having a throttle plate 64. In this particular example, the position of throttle plate 64 may be varied by controller 20 via a signal provided to an electric motor or actuator included with throttle 62, a configuration that is commonly referred to as electronic throttle control (ETC). In this manner, throttle 62 may be operated to vary the intake air provided to combustion chamber 71 among other engine cylinders. The position of throttle plate 64 may be provided to controller 20 by throttle position signal TP. Intake passage 42 may include a mass air flow sensor 120 and a manifold air pressure sensor 122 for providing respective signals MAF and MAP to controller 20.

Ignition system 88 can provide an ignition spark to combustion chamber 71 via spark plug 92 in response to spark advance signal SA from controller 20, under select operating modes. Though spark ignition components are shown, in some embodiments, combustion chamber 71 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Controller 20 is shown in FIG. 1 as a microcomputer, including microprocessor unit 102, input/output ports 21, an electronic storage medium for executable programs and calibration values shown as read only memory chip 106 in this particular example, random access memory 108, keep alive memory 110, and a data bus. Controller 20 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 80; throttle position (TP) from a throttle position sensor; and absolute manifold pressure signal, MAP, from sensor 122. Engine speed signal, RPM, may be generated by controller 20 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Storage medium read-only memory 106 can be programmed with computer readable data representing instructions executable by processor 20 for performing the methods described below as well as other variants that are anticipated but not specifically listed.

As described above, FIG. 1 shows only one cylinder of a multi-cylinder engine, and that each cylinder may similarly include its own set of intake/exhaust valves, fuel injector, spark plug, etc.

With reference to FIG. 2 there is shown a motor vehicle 5 having a combustion engine 10, for example including a cylinder as described in FIG. 1, drivingly connected to a high voltage integrated motor generator 11, belt integrated starter generator (BISG), forming part of a high voltage power system. The BISG 11 may operate in two modes. In the first mode, the BISG may be driven by the engine 10 using a FEAD belt (not shown on FIG. 2), for example, to produce electrical power for storage in a high voltage battery 13 (HV battery) forming part of the high voltage power system that also includes a high voltage battery management system 12 (HVBMS). In the second mode, the BISG may be powered by the HV battery 13 to provide a driving torque to the engine 10 via the FEAD belt. In another example, a READ belt may be used instead of a FEAD belt.

The high voltage power system may be operatively connected via a DC to DC converter 14 to a low voltage power system comprising a low voltage battery 16 (LV battery) that also includes a low voltage battery management system 15 (LVBMS).

The low voltage power system may also include a number of low voltage loads (LV loads) which constitute the majority of the electrical devices provided on the motor vehicle 5.

In this example, the low voltage power system operates at a nominal voltage of 12 volts and the high power system operates at a nominal voltage of 48 volts but the application is not limited to the use of such voltages.

An electronic controller 20 is operatively connected to the DC to DC converter 14 and to the high and low voltage battery management systems (HVBMS 12 and LVBMS 15). In this case the electronic controller 20 is embodied as a single control unit but it will be appreciated that the controller 20 could be formed of several interconnected electronic units or processors.

In this example the electronic controller 20 is an engine stop-start controller for the motor vehicle 5 and may be connected to various inputs 21a used to determine when the engine 10 should be automatically temporarily stopped in order to save fuel and to a crankshaft position sensor 22. Such a stop is referred to herein as an 'E-stop' because its function is to increase the economy of the engine 10. As is well known in the art various triggers may be used to initiate an E-stop based upon operation of various driver actions and further triggers based upon driver actions can be used to initiate an automatic restart following an E-stop. Any suitable combination of stop and start triggers can be used in accordance with this application. For example, the depression of the accelerator pedal may be used to determining an automatic restart following an E-stop.

An E-stop is one where the engine 10 is temporarily stopped to save fuel and reduce emissions by the electronic controller 20 in response to one or more conditions based upon driver actions. For example, an E-stop may be enacted in response to the vehicle being stopped.

With reference to FIG. 3A there is shown one embodiment of a front engine accessory drive (FEAD) having a FEAD belt 33 drivingly engaged with a crankshaft pulley 30, a drive pulley 31 of the BISG 11 and in this case a drive pulley 32 of an air-conditioner pump. It will be appreciated that the FEAD belt 33 could also be used to drive one or more other accessories such as, for example and without limitation, a power steering pump, an oil pump and a water pump.

A tensioner pulley 36 is located on a driven side of the FEAD belt 33 with respect to the BISG pulley 31. When the BISG 11 is used to start the engine 10 or to pre-tension the BISG belt 33 in accordance with this application, the BISG rotates the engine 10 in the direction of the arrow 'R' on FIG. 3a and will produce a reaction in the FEAD belt 33 as indicated by the arrow 'r'. A passive tensioner 40 is provided to apply a static tension to the FEAD belt 33.

With reference to FIG. 3B there is shown a second embodiment of a front engine accessory drive (FEAD) that is essentially the same as that shown in FIG. 3A with the exception that a second tensioner pulley 46 and passive tensioner 50 is provided on a driving side of the FEAD belt 33. As before, when the BISG 11 is used to start the engine 10 or to pre-tension the BISG belt 33 in accordance with this application it rotates the engine 10 in the direction of the arrow 'R' on FIG. 3B and will produce a reaction in the FEAD belt 33 as indicated by the arrow 'r'.

Figure 3C:
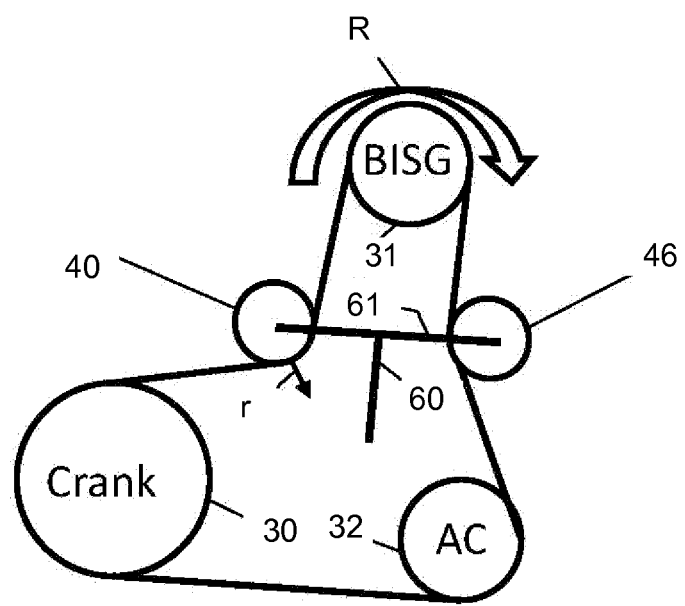

With reference to FIG. 3C there is shown a third embodiment of a front engine accessory drive (FEAD) that is essentially the same as that shown in FIG. 3B with the exception that the two passive tensioners 40, 50 of FIG. 3B are replaced by a single passive tensioner 60 and linkage 61.

In FIGS. 3A to 3C the crankshaft of the engine 10 rotates in a clockwise direction when viewed from the front of the engine 10 however, it will be appreciated that the application is also applicable to engines that rotate in the opposite direction.

As described previously, when the BISG 11 is used to start the engine 10 or to pre-tension the BISG belt 33 following an E-stop in accordance with this application, the BISG rotates the engine 10 in the direction of the arrow 'R' on FIG. 3C and will produce a reaction in the FEAD belt 33 as indicated by the arrow 'r'.

During normal running of the engine 10 the electronic controller 20, in response to information regarding the running state of the engine 10 and the state of charge (SOC) of the high voltage battery 13, will operate the BISG 11 as a generator in order to recharge the HV battery 13. In another example, if the motor vehicle is a mild hybrid motor vehicle, then the BISG 11 may also be used as a motor to assist the engine 10 thereby reducing the fuel consumption of the engine 10. Preferably, the BISG 11 is operated as a generator with no fuel penalty when there is an opportunity to recover or recuperate kinetic energy from the vehicle 5.

Electrical power may also be transferred during normal running from the high voltage power system via the DC to DC converter 14 to recharge or maintain the SOC of the LV battery 16 at a predefined high level.

When the inputs 21a indicate that an E-stop would be beneficial, the electronic controller 20 is operable to shut down the engine 10.

When the engine 10 is sensed to be stopped, the electronic controller 20 is operable to energize the BISG 11 to cause it to rotate the engine 10 at a very low speed using a high torque, which may be the maximum torque available from the BISG 11. The speed at which the BISG 11 rotates is very low such as to cause the crankshaft to rotate at a speed below that at which ignition of the engine will occur such as, for example and without limitation 50 RPM.

Therefore, during a warm engine E-stop event, once the crank speed falls to zero, the BISG 11 is operated at high torque and low speed to rotate the engine crankshaft in the cranking direction up to 720° from the position it originally came to rest. The output from the crankshaft position sensor 22 is used by the electronic controller 20 to determine when an optimum angular position for the crankshaft has been attained. It will be appreciated that a short delay could be provided between the point in time the engine first comes to rest and the point in time that the BISG 11 is energized in order to allow the various systems and components to reach a stable state.

Operating the BISG 11 in this way to rotate the crankshaft will have the following effects; firstly, any hysteresis left in the belt tensioning system from engine shutdown will be removed and secondly, by rotating the engine 10 in the normal cranking direction, tension will be raised in the FEAD belt on the correct or driven side of the FEAD belt to a level higher than a neutral or resting level. In this way the tensioning system will be primed or pre-tensioned for subsequent engine cranking.

The amount of rotation of the crankshaft will depend on the number of cylinders the engine 10 has, the firing order of the cylinders and the position that the crankshaft stops in when the E-stop commences. However, the eventual stop position (the optimum stop position) should be when the next firing cylinder (the lead cylinder) is at the optimum position for firing the next time the piston of the lead cylinder reaches the TDC position. The lead cylinder will then be primed with a full charge of air to allow engine firing the first time the TDC position is reached in the lead cylinder during cranking by the BISG 11.

Pre-positioning of a crankshaft is known, see for example, U.S. Pat. No. 6,202,614 but in the case of the current application the pre-positioning begins as soon as the engine 10 ceases rotating rather than when a restart signal is provided, thereby reducing the time to restart the engine 10 as the engine 10 is ready to start and there is no need to wait for it to be positioned.

If the rotation of the crankshaft is slow enough and the stop event is long enough, the forces of compression in the cylinders of the engine 10 may be largely ignored as the cylinder pressures degrade rapidly once the engine is stopped. Allowing a compressed cylinder to dissipate any pressure is important because any stored energy in such a cylinder could rotate the crank once the BISG 11 stops moving and is powered down. If this crankshaft rotation is backwards, that is to say in an opposite direction to that in which it is started and normally runs, then the pre-tension previously generated in the FEAD belt by the BISG 11 could potentially be removed.

One method for addressing the above issue, such backwards rotation, may be to keep the BISG 11 energized at a level sufficient to provide a holding torque against any rotation due to engine compression. Keeping the BISG 11 energized in this way is also advantageous because the BISG 11 would then have a zero pre-flux time and so would provide an even shorter cranking time. However, keeping the BISG 11 energized will reduce the SOC of the HV battery 13 and so may not be possible if the SOC of the HV battery 13 is below a predefined level or the E-stop continues for a long period of time.

As an alternative the BISG 11 may be kept energized at the holding level for a predefined period of time so as to give time for any pressure in a compressed cylinder to dissipate and then, after the predefined period of time has elapsed, the BISG 11 is de-energized or powered down. In such a case the predefined period of time would need to be set so as to provide sufficient time for the compressed gas to dissipate.

When the inputs 21a to the electronic controller 20 indicate that a restart is required, the electronic controller 20 communicates this fact to the HVBMS 12 and is operable to supply electrical power from the HV battery 13 to the BISG 11 to restart the engine 10.

It will be appreciated that the application is not limited to an electrical power system having high and low voltage power systems and can be used with equal advantageous effect on a motor vehicle having any type of electrical power system that uses a BISG.

Figure 4:
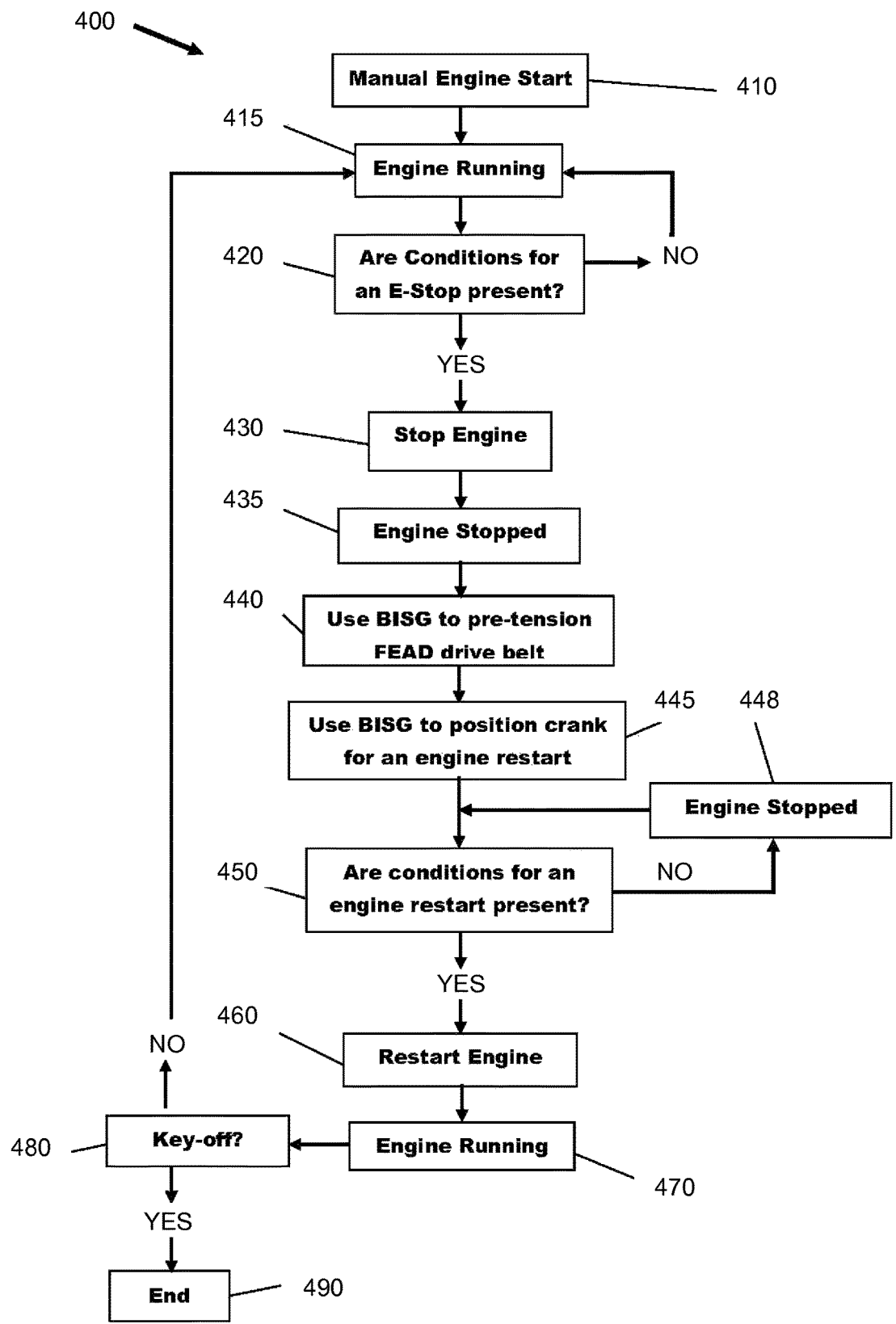
FIG. 4 is an example high level flow chart of a method of controlling an engine of a motor vehicle in accordance with a first aspect of the application.

With reference to FIG. 4 there is shown a method 400 for controlling an engine of a motor vehicle such as the vehicle 5 shown in FIG. 2. Method 400 is illustrated with a belt drive drivingly connecting a crankshaft of the engine to an integrated starter-generator. In this example, the belt drive is a FEAD belt. In another example, the belt drive may be a READ belt. The method starts in box 410 with a manual engine start. The manual engine start may be referred to as a key-on event. In one example, the engine may be started using a BISG such as the BISG 1. In another example, the engine may be started by a conventional starter motor fitted to the vehicle 5.

The method then advances to box 415 with the engine running. The method then proceeds on to box 420 where the method determines whether conditions for an E-stop are present In the example case of an automatic vehicle, the conditions for an E-stop may be that an accelerator pedal is not being pressed and a brake pedal is being pressed. In the example case of a manual transmission, the conditions for an E-stop may be based upon whether a gear is selected and the position of a clutch pedal. For example and without limitation, two typical combinations of conditions are firstly that a clutch pedal is fully depressed and a transmission in gear (a stop in gear stop) and secondly, no gear selected with the brake pedal pressed (a stop in neutral stop). It will be appreciated that numerous combinations of engine stop conditions are known and that the application is not limited to any particular combination of engine stop conditions.

If a predefined combination of conditions is present for an E-stop, then the method may advance to box 430. If no predefined combination of conditions is present for an E-stop, the method may return to box 415 with the engine running.

In box 430, the method may stop the engine. Thus, the engine is shut down and the method may proceed to box 435 where the engine has stopped. That is to say, the engine has entered an E-stop.

In box 440, after the engine has stopped, the BISG is used to pre-tension an FEAD belt, such as the FEAD belt 33 shown in FIGS. 3A to 3C, by rotating the crankshaft slowly in the same direction required for starting the engine with the BISG operating at high torque. In one example, the high torque of the BISG may be a maximum torque of the BISG.

As described previously, the speed of rotation of the crankshaft is slow enough to prevent firing of the engine.

The rotation of the crankshaft by the BISG will continue until the crankshaft has been rotated into a preferred rotational position ready for restarting of the engine as indicated in box 445. In one example, the BISG may rotate the crankshaft up to 720 degrees from the rotational position it originally stops in. In another example, the BISG may rotate the crankshaft less than 720 degrees from the position it originally stops in. The final or optimum position is such that the next firing cylinder (the lead cylinder) is in the optimum position for firing the next time the piston of that cylinder reaches TDC. The lead cylinder is then primed with a full charge of air ready to allow engine firing the first time TDC position is reached in the lead cylinder during cranking by the BISG upon an engine restart.

The method then continues to box 450, wherein the method checks to determine whether the conditions for an engine restart are present. For example and without limitation, in the case of an automatic vehicle these restart conditions may be the releasing of a brake pedal or the application of pressure to an accelerator pedal. For example, in the case of a manual transmission vehicle these restart conditions may be the partial releasing of a clutch pedal while the transmission is in gear or the depressing of a clutch pedal and the engagement of a gear if the transmission is in neutral during the E-stop. It will be appreciated that numerous combinations of engine restart conditions are known and that the application is not limited to any particular combination of restart conditions.

If the conditions are not present, the method may return to box 450 via box 448 with the engine still stopped. This E-stop state will continue until the conditions for a restart are present, at which time the method may advance from box 450 to box 460 where the engine is restarted. The engine may be restarted using the BISG to drive the FEAD belt to rotate the crankshaft.

A rapid restart of the engine can be affected at 460 because any hysteresis has been removed from the tensioner, any slack has been removed from the FEAD belt and the tension in the FEAD belt has been increased to a sufficiently high level to resist slipping between the BISG pulley and the FEAD belt even if the torque-on profile is very aggressive.

Although not shown in method 400 of FIG. 4, a further step could be used between boxes 445 and 450 in which the BISG is kept energized at a low holding level during the E-stop after the crankshaft has been correctly positioned for the restart. This on-going energization has the advantage that the BISG will have a zero pre-flux time because it is already energized and this will further reduce the start time for the engine. It will be appreciated that if the BISG is switched off then it takes a short period of time for the flux to build in the BISG before it can generate a useful level of torque.

After the restart the engine at 460, the engine is running, as indicated in box 470.

From box 470 the method proceeds to 480 to determine if a key-off event is present. If no Key-off event is present, the method proceeds to box 415 with the engine running and then the subsequent steps are repeated.

If yes, a key-off event occurs at 480, then the method will terminate as indicated by box 490.

It will be appreciated that a key-off event could occur at other points in time during the execution of the steps 415 to 470 and that, whenever a key-off event occurs, it will result in an ending of the method.

Although the application has been described with respect to a conventional motor vehicle comprising a stop start controller it could be applied to a mild hybrid motor vehicle in which case the BISG could be used to provide torque to assist the engine during normal running of the engine.

Furthermore, although the application is particularly advantageous for use with a belt drive using one or more passive belt tensioners, it will be appreciated that it could also be used with a system comprising one or more active belt tensioners with some positive effect by reducing the cranking time by rotating the crankshaft into an optimum position for restarting the engine.

It is also advantageous with any type of belt tensioner arrangement to maintain the BISG energized and producing sufficient torque to hold the crankshaft against negative rotation due to cylinder compression effects because the preferred rotational position of the crankshaft is then maintained.

It is further advantageous with any type of belt tensioner arrangement to maintain the BISG on producing some torque because a zero pre-flux time is then produced thereby reducing the cranking time.

It will be appreciated by those skilled in the art that although the application has been described by way of example with reference to one or more embodiments it is not limited to the disclosed embodiments and that alternative embodiments could be constructed without departing from the scope of the application as defined by the appended claims.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of controlling an engine of a motor vehicle comprising:
   the engine;
   a belt drive driving connecting a crankshaft of the engine to an integrated starter-generator, where the belt drive is coupled to an accessory distinct from the integrated starter-generator; and
   at least one belt tensioner for applying a tension load to the belt drive;
   wherein the method comprises;
      operating in a first operating mode while the engine is running;
      during the first operating mode while the engine is running, driving the belt drive with the engine using a belt;
      operating in a second operating mode with the engine crankshaft ceased rotating and before a restart signal is provided to the engine in response to a restart trigger; and
      in the second operating mode, determining whether it is desirable to perform an automatic engine stop and, if it is desirable to stop the engine, stopping the engine and, as soon as the engine has stopped and before the restart signal is provided, energizing the integrated starter-generator with a high-voltage battery system to rotate the crankshaft at low speed below which engine ignition occurs in a direction required for starting the engine to a desired starting position while also applying a maximum available torque to the belt drive to pre-tension the belt drive for restarting of the engine, wherein a pre-tensioning level of the belt is selected at a sufficiently high level to avoid slipping between the integrated starter-generator and the belt during the subsequent restarting.

2. The method of claim 1 wherein the at least one belt tensioner is a passive belt tensioner.

3. The method of claim 1 wherein the method further comprises using the integrated starter-generator to rotate the crankshaft at the low speed while applying the maximum available torque to the belt drive until the crankshaft has been rotated into an optimum position for restarting the engine.

4. The method of claim 3 wherein the method further comprises maintaining the integrated starter-generator energized after the optimum position has been attained in order to resist rotation of the crankshaft away from the optimum position for restarting of the engine.

5. The method of claim 1 wherein the method further comprises using the integrated starter-generator to restart the engine if predefined conditions for restarting the engine are present.

6. The method of claim 5 wherein the predefined conditions for restarting the engine include an accelerator pedal of the motor vehicle in a pressed state.

7. The method of claim 1 wherein the crankshaft is rotated at a speed of less than fifty revolutions per minute.

8. A method for an engine including a crankshaft driveably connected by a front end accessory drive (FEAD) belt to a belt integrated starter-generator (BISG) and a passive belt tensioner for applying a tension load to a belt drive of the FEAD including a static pre-load, comprising:
operating in a first operating mode while the engine is running;
during the first operating mode while the engine is running, driving the BISG with the engine using the FEAD belt, wherein the FEAD belt is rotationally coupled to an accessory distinct from the BISG;
operating in a second operating mode with the crankshaft ceased rotating and before a restart signal is provided to the engine in response to a restart trigger; and
during the second operating mode performed as soon as the crankshaft ceases rotating and before the restart signal is provided to the engine in response to the restart trigger, powering the BISG with a high voltage battery and pre-tensioning the FEAD belt to a tension level higher than a resting level by operating the BISG at a maximum available torque, while also rotating the crankshaft, with the BISG, below a speed at which engine ignition occurs, until the crankshaft has been pre-positioned at an angle for restarting the engine, wherein the pre-tensioning level of the FEAD belt is a sufficiently high level to avoid slipping between the BISG and the FEAD belt during the subsequent restarting.

9. The method of claim 8, further comprising, while operating in the first operating mode, using the BISG as a generator to recharge the high voltage battery, wherein the engine further comprises a low voltage battery, wherein the second operating mode is during a warm engine E-stop event.

10. The method of claim 8, wherein the FEAD belt is drivingly engaged with a crankshaft pulley, a drive pulley of the BISG, and a drive pulley of at least one accessory of the engine, and wherein the high voltage battery is coupled to a low voltage battery via a DC-DC converter.

11. The method of claim 8, wherein the engine further comprises a low voltage battery, and wherein a nominal voltage at which the low voltage battery operates is lower than a nominal voltage at which the high voltage battery operates.

12. The method of claim 8, further comprising, after pre-positioning the crankshaft, maintaining the BISG energized until the restart signal is provided to provide a holding torque against backwards rotation of the crankshaft, wherein the holding torque is lower than the torque at the maximum available torque.

* * * * *